(12) United States Patent
Kamijima (10) Patent No.: US 11,478,874 B2
(45) Date of Patent: Oct. 25, 2022

(54) METHOD OF PROCESSING INORGANIC MATERIAL SUBSTRATE, DEVICE, AND METHOD OF MANUFACTURING DEVICE

(71) Applicant: TDK Corporation, Tokyo (JP)

(72) Inventor: Akifumi Kamijima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 188 days.

(21) Appl. No.: 16/821,485

(22) Filed: Mar. 17, 2020

(65) Prior Publication Data

US 2020/0316712 A1 Oct. 8, 2020

(30) Foreign Application Priority Data

Apr. 5, 2019 (JP) .............................. JP2019-072514

(51) Int. Cl.
*B23K 26/06* (2014.01)
*B23K 26/382* (2014.01)
*B23K 26/362* (2014.01)
*B23K 103/00* (2006.01)

(52) U.S. Cl.
CPC ........ *B23K 26/0661* (2013.01); *B23K 26/362* (2013.01); *B23K 26/382* (2015.10); *B23K 2103/54* (2018.08)

(58) Field of Classification Search
CPC .......... A61B 2562/0209; A61B 5/6804; A61B 5/6802; A61B 5/291; A61B 5/274; A61B 5/25; A61B 5/0006; B23K 26/362; B23K 26/382; B23K 26/53; B23K 26/57; B23K 26/082; B23K 26/0661; B23K 26/0006; B23K 2103/54

USPC ..................................................... 219/121.69
See application file for complete search history.

(56) References Cited

U.S. PATENT DOCUMENTS

| | | | | |
|---|---|---|---|---|
| 8,541,319 | B2* | 9/2013 | Shimoi | B23K 26/0006 438/795 |
| 10,211,365 | B2* | 2/2019 | Bouvier | H01L 33/18 |
| 2002/0070382 | A1* | 6/2002 | Yamazaki | G02F 1/13458 257/72 |
| 2010/0136766 | A1 | 6/2010 | Sakamoto et al. | |
| 2012/0129359 | A1 | 5/2012 | Shimoi et al. | |
| 2012/0131958 | A1 | 5/2012 | Shimoi et al. | |
| 2012/0135585 | A1 | 5/2012 | Shimoi et al. | |
| 2012/0308765 | A1* | 12/2012 | Nukaga | H01L 21/3065 428/98 |

(Continued)

FOREIGN PATENT DOCUMENTS

| | | |
|---|---|---|
| CN | 103025472 A | 4/2013 |
| CN | 103026468 A | 4/2013 |

(Continued)

*Primary Examiner* — Dana Ross
*Assistant Examiner* — Joseph W Iskra
(74) *Attorney, Agent, or Firm* — Oliff PLC (57) ABSTRACT

In a method of processing a substrate, in a second step, only some of a plurality of altered portions are exposed from an opening portion of a mask, and the remaining portions are not exposed. In this case, at the time of etching in a third step, an etching rate may be made different between the altered portions exposed from the opening portion of the mask and the altered portions which are not exposed. Accordingly, it becomes easier to obtain a desired processed shape by adjusting the altered portions exposed from the opening portion of the mask and the altered portions which are not exposed.

12 Claims, 8 Drawing Sheets

(56) References Cited

U.S. PATENT DOCUMENTS

| | | |
|---|---|---|
| 2016/0059359 A1 | 3/2016 | Krueger et al. |
| 2016/0060156 A1 | 3/2016 | Krueger et al. |
| 2016/0199944 A1 | 7/2016 | Hosseini |
| 2016/0218240 A1 | 7/2016 | Bouvier et al. |
| 2017/0341971 A1 | 11/2017 | Krueger et al. |
| 2018/0301594 A1 | 10/2018 | Bouvier et al. |
| 2019/0148142 A1 | 5/2019 | Tsunetomo et al. |

FOREIGN PATENT DOCUMENTS

| | | |
|---|---|---|
| JP | H02-030390 A | 1/1990 |
| JP | 2004-114066 A | 4/2004 |
| JP | 2004-351494 A | 12/2004 |
| JP | 2004-359475 A | 12/2004 |
| JP | 2005-306702 A | 11/2005 |
| JP | 2006-290630 A | 10/2006 |
| JP | 2007-069216 A | 3/2007 |
| JP | 2009-503903 A | 1/2009 |
| JP | 2009-061667 A | 3/2009 |
| JP | 4880820 B2 | 2/2012 |
| JP | 2018-509298 A | 4/2018 |
| WO | 2007/016557 A2 | 2/2007 |
| WO | 2008/146744 A1 | 12/2008 |
| WO | 2011/096353 A1 | 8/2011 |
| WO | 2012/014710 A1 | 2/2012 |
| WO | 2014/111385 A1 | 7/2014 |
| WO | 2014/111794 A1 | 7/2014 |
| WO | 2014/161534 A2 | 10/2014 |
| WO | 2015-044620 A1 | 4/2015 |
| WO | 2015/095089 A2 | 6/2015 |
| WO | 2015/113026 A2 | 7/2015 |
| WO | 2016/051781 A1 | 4/2016 |
| WO | 2016/114934 A1 | 7/2016 |
| WO | 2016/137488 A1 | 9/2016 |
| WO | 2018/216712 A1 | 11/2018 |

\* cited by examiner

| | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | EXAMPLE 1 | EXAMPLE 2 | EXAMPLE 3 |
|---|---|---|---|---|---|---|---|---|
| MASK BEFORE IRRADIATION | ○ | | | | | | | |
| MASK AFTER IRRADIATION | | ○ | ○ | | ○ | ○ | ○ | ○ |
| LINE PROCESSING | ○ | ○ | | | ○ | ○ | ○ | |
| HOLE PROCESSING | | | ○ | ○ | | | | ○ |
| LASER IRRADIATION | - | NG | - | NG | OK | OK | OK | OK |
| MODIFIED PORTION | | P1-P5 | | P1-P5 | P1-P5 | P1-P15 | P1-P5, P9,P10, P14,P15 | P1-P5, P9,P10, P14,P15 |
| DIFFERENCE d (μm) | 250 | - | 220 | - | 180 | 50 | 25 | 20 |

METHOD OF PROCESSING INORGANIC MATERIAL SUBSTRATE, DEVICE, AND METHOD OF MANUFACTURING DEVICE

CROSS-REFERENCE TO RELATED APPLICATIONS

This application is based upon and claims the benefit of priority from Japanese Patent Application No. 2019-72514, filed on Apr. 5, 2019, the entire content of which is incorporated herein by reference.

TECHNICAL FIELD

The disclosure relates to a method of processing an inorganic material substrate, a device, and a method of manufacturing a device.

BACKGROUND

Conventionally, a method in which a laser is condensed inside a substrate to change a portion on which the laser is condensed, and then an inorganic material substrate is subjected to an etching treatment (a so-called laser assisted etching method) is known as a method of processing an inorganic material substrate such as a glass substrate (for example, forming minute holes) (for example, refer to Patent Documents 1 to 8 below).

PATENT DOCUMENTS

[Patent Document 1] Japanese Patent No. 4880820
[Patent Document 2] Japanese Unexamined Patent Publication No. 2006-290630
[Patent Document 3] Japanese Unexamined Patent Publication No. 2004-359475
[Patent Document 4] Japanese Unexamined Patent Publication No. 2004-351494
[Patent Document 5] Japanese Unexamined Patent Publication No. 2005-306702
[Patent Document 6] Japanese Unexamined Patent Publication No. 2018-509298
[Patent Document 7] Japanese Unexamined Patent Publication No. 1990-30390
[Patent Document 8] Japanese Unexamined Patent Publication No. 2007-69216

SUMMARY

The inventor has conducted intensive research on a technology for processing an inorganic material substrate, and as a result, has newly found a technology for improving controllability by which a processing shape (that is, an inner wall shape of a portion exposed by processing) is controlled to become a desired shape.

According to the disclosure, there are provided a method of processing an inorganic material substrate, a device, and a method of manufacturing a device, in which controllability of a processing shape is improved.

A method of processing an inorganic material substrate according to one aspect of the disclosure includes a first step of forming a plurality of altered portions inside an inorganic material substrate transparent to a laser by means of radiation of the laser to the inorganic material substrate, a second step of covering at least one surface of the inorganic material substrate having the altered portions formed therein with a mask, the mask exposes some of the plurality of altered portions through an opening portion of the mask overlaps remaining portions of the plurality of altered portions, and a third step of performing an etching process on the inorganic material substrate using the mask and removing the altered portions.

In the method of processing an inorganic material substrate, in the second step, only some of the plurality of altered portions are exposed from the opening portion of the mask, and the remaining portions are not exposed. In this case, at the time of etching in the third step, an etching rate may be made different between the altered portions exposed from the opening portion of the mask and the altered portions which are not exposed. Accordingly, it becomes easier to obtain a desired processed shape by adjusting the altered portions exposed from the opening portion of the mask and the altered portions which are not exposed.

In another aspect of the method of processing an inorganic material substrate, the inorganic material substrate may be made of an amorphous solid or a hybrid of an amorphous material and a crystalline material. In this case, since the inorganic material substrate is isotropically etched in the third step, the processed shape can be controlled with high accuracy.

In yet another aspect of the method of processing an inorganic material substrate, the inorganic material substrate may be made of glass.

In still another aspect of the method of processing an inorganic material substrate, the laser used in the first step may be a Yb:YAG picosecond laser.

In yet still another aspect of the method of processing an inorganic material substrate, a wavelength conversion element may be disposed on an optical path of the laser in the first step, and a wavelength of the laser may be converted to a visible light region by the wavelength conversion element.

In yet still another aspect of the method of processing an inorganic material substrate, in the second step, position alignment of the mask may be performed with reference to positions of the altered portions.

In yet still another aspect of the method of processing an inorganic material substrate, an alignment mark may be formed on the inorganic material substrate using the laser in the first step, and the position alignment of the mask may be performed with reference to the alignment mark in the second step.

In yet still another aspect of the method of processing an inorganic material substrate, in the third step, a hole may be formed in the inorganic material substrate by removing the altered portions.

In yet still another aspect of the method of processing an inorganic material substrate, in the third step, the inorganic material substrate may be segmented into individual pieces by removing the altered portions.

A device according to one aspect of the disclosure includes the inorganic material substrate in which a hole is formed by the above-described method A device according to one aspect of the disclosure includes the inorganic material substrate which is segmented into the individual pieces by the above-described method.

In a method of manufacturing a device according to one aspect of the disclosure, the device is manufactured using the inorganic material substrate processed by the above-described method.

DETAILED DESCRIPTION

Hereinafter, embodiments of the disclosure will be described in detail with reference to the accompanying drawings. In the description, the same elements or elements having the same functions will be designated by the same reference numerals, and redundant description will be omitted.

Hereinafter, a method of processing an inorganic material substrate will be described with reference to a flowchart of FIG. 1. More specifically, a method of cutting a glass substrate which is a kind of inorganic material substrate in a straight line will be described.

Figure 2:
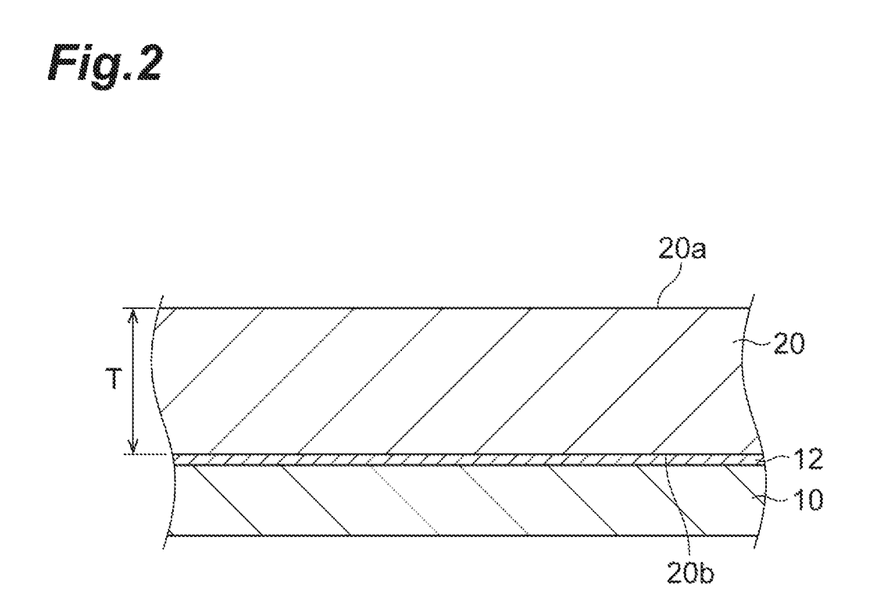
FIG. 2 is a view showing one process of the flowchart shown in FIG. 1.

A form of a substrate to be processed is as shown in FIG. 2. That is, a substrate 20 is placed on a support sheet 10 via a release layer 12. In this form, an upper surface 20a of the substrate 20 is exposed, and a lower surface 20b of the substrate 20 is covered with the release layer 12. The support sheet 10 is, for example, a PTFE porous sheet. The release layer 12 is a resin layer formed on the support sheet 10. The release layer 12 is made of a material having resistance to an etchant used for wet etching which will be described later. For example, the release layer 12 can be made of a resin (for example, an epoxy resin, an acrylic resin, an epoxy acrylate resin, or the like) and may be a resin to which a filler made of an inorganic material, a metal material, or the like is added.

In the embodiment, the substrate 20 is made of non-alkali glass. A thickness T of the substrate 20 is, for example, 20 to 1000 μm and is 500 μm in the embodiment. The form of the substrate 20 is not particularly limited, and for example, it may be processed in a wafer form (for example, an 8-inch wafer).

Figure 1:
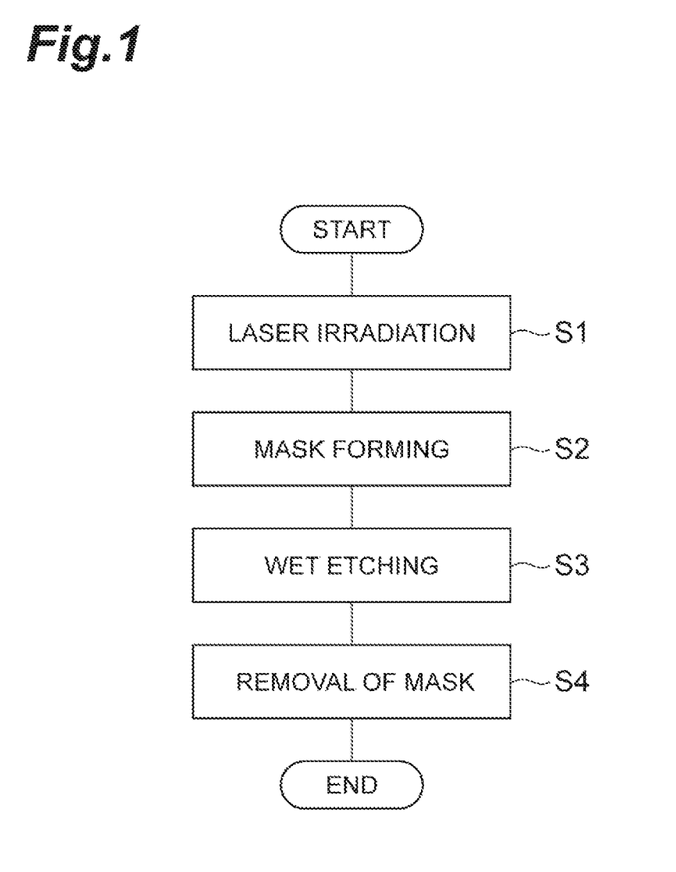
FIG. 1 is a flowchart of a method of processing an inorganic material substrate according to an embodiment.
Figure 3A:
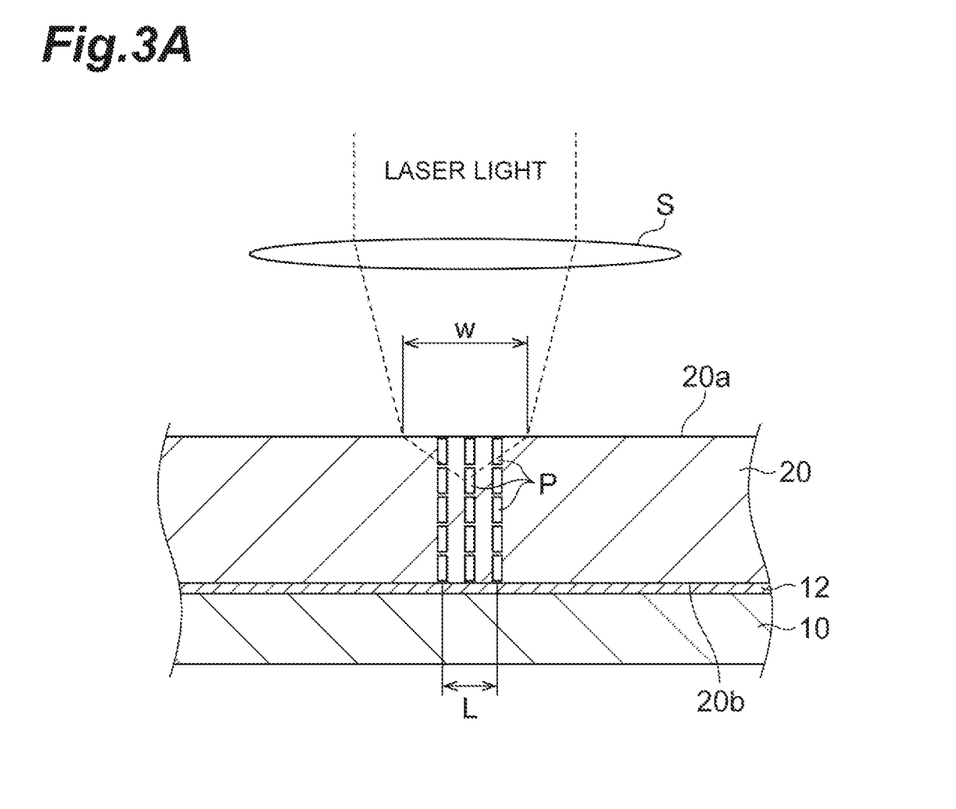
FIGS. 3A and 3B are views showing one process of the flowchart shown in FIG. 1.
Figure 3B:
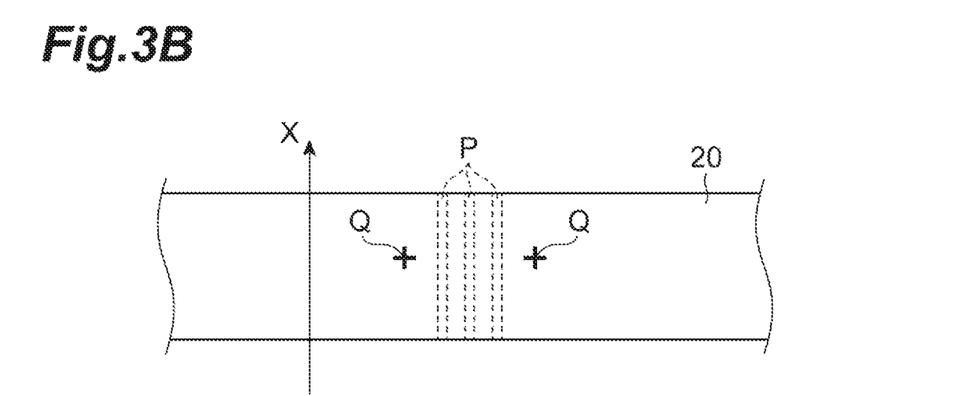

When the above-described substrate 20 is processed, first, laser irradiation is performed on the substrate 20 (Step S1 in FIG. 1, a first step). As shown in FIGS. 3A and 3B, a laser is emitted from a light source (not shown) toward the substrate 20, passes through an optical element S disposed on an optical path, and is then radiated on the substrate 20. The optical element S has a function as a condensing lens and also has a function as a wavelength conversion element which converts a wavelength of the laser into a wavelength in a visible light region. A Yb:YAG picosecond laser (having a wavelength of 1030 nm) can be used as a light source. The optical element S can convert a wavelength of the laser to ½ (that is, a wavelength of 515 nm) as the wavelength conversion element. A laser width w (an irradiation width) on the upper surface 20a of the substrate 20 is, for example, about 650 μm.

An altered portion P of which a material has changed is formed at a condensed spot by condensing the laser inside the substrate 20. For example, with single spot irradiation, a substantially cylindrical modification having a thickness of about 100 μm and a diameter of about 10 μm is generated around a focal point, and the modification can be caused to continue by laser scanning. Micro-cracks generated in the altered portion P are considered. An output and scanning speed of the laser can be adjusted as appropriate so that the desired modification is generated. A plane position of the altered portion P in a plane parallel to the upper surface 20a of the substrate 20 (that is, a plane position of the condensed spot) can be adjusted by the laser scanning. Further, a depth position of the altered portion P (that is, a depth position of the condensed spot) can be adjusted by changing the focal depth based on a position of the upper surface 20a measured in advance or changing a relative distance between the substrate 20 and the optical element S.

In Step S1, as shown in FIGS. 3A and 3B, a plurality of altered portions P having different height positions or plane positions are formed.

Figure 4:
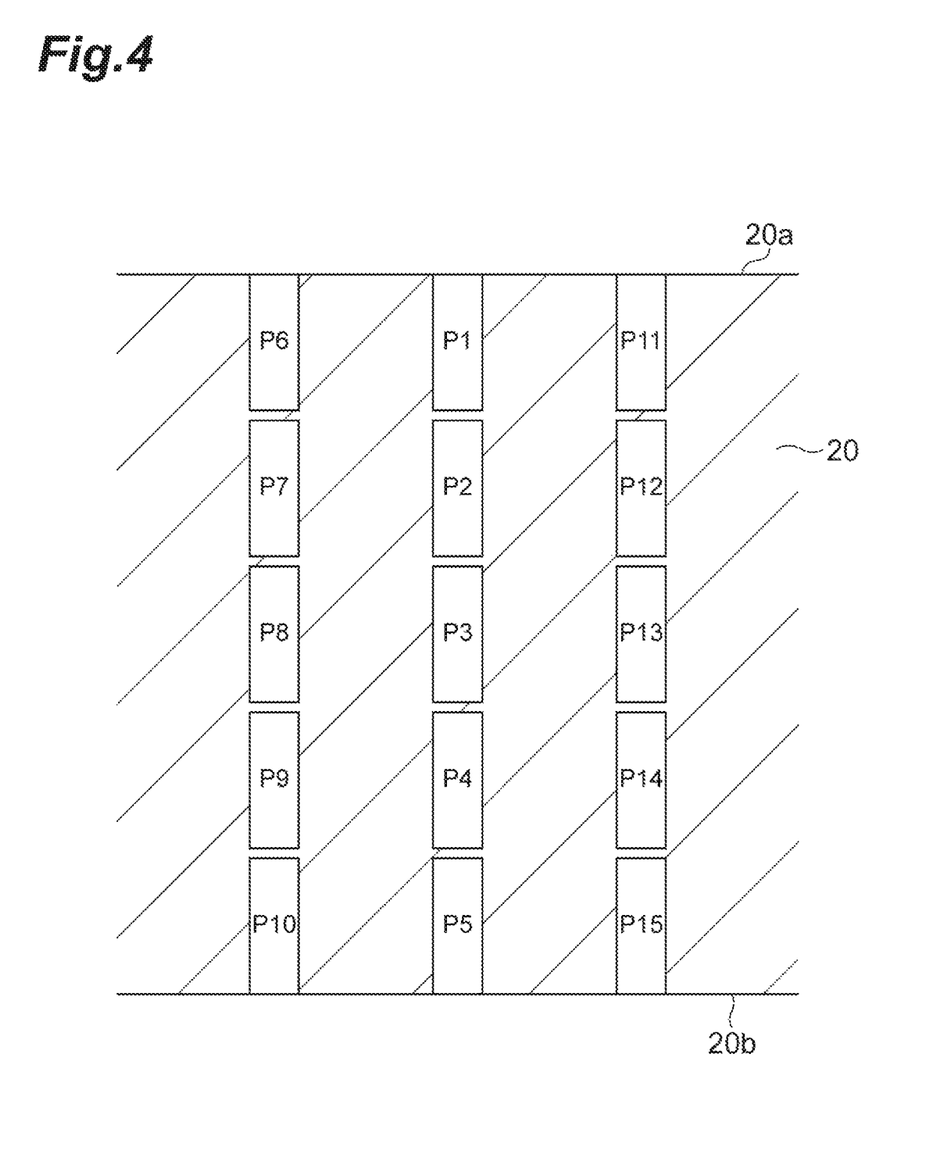
FIG. 4 is a view showing one process of the flowchart shown in FIG. 1.

In the embodiment, as shown in FIG. 4, fifteen altered portions P (altered portions P1 to P15) are formed at different positions. In FIG. 4, although a cross-sectional shape of each of the altered portions P is indicated by a rectangle which extends in a thickness direction of the substrate 20, an interface between the altered portion P and the other portions is not clear, and a material thereof is considered to change stepwise.

The five altered portions P1 to P5 shown in FIG. 4 are evenly arranged in the thickness direction of the substrate 20. All the altered portions P1 to P5 extend in a cutting direction of the substrate 20 (an X direction in FIG. 3B). Similarly, five altered portions P6 to P10 and five altered portions P11 to P15 are evenly arranged in the thickness direction of the substrate 20 and extend in the cutting direction X of the substrate 20 to sandwich the altered portions P1 to P5 at regular intervals. An overall width L (a length in a direction perpendicular to the cutting direction) of the altered portions P1 to P15 is 150 μm as an example.

In Step S1, an alignment mark Q which is used for position alignment when a subsequent mask is formed may be formed on the upper surface 20a of the substrate 20 using the same laser.

Next, a mask 30 is formed on the upper surface 20a of the substrate 20 in which the altered portion P is formed (Step S2 in FIG. 1, a second step).

Figure 5A:
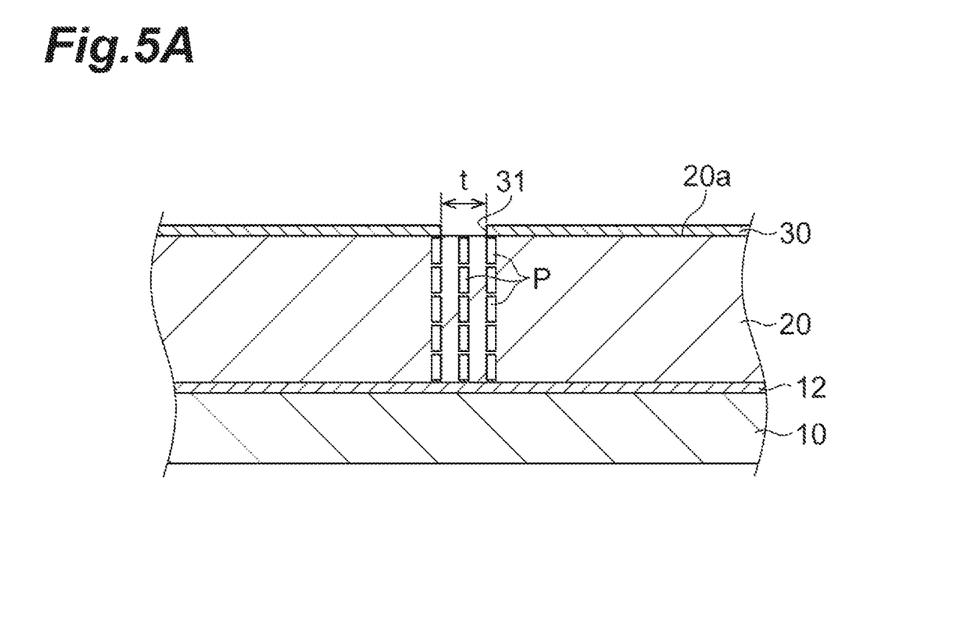
FIGS. 5A and 5B are views showing one process of the flowchart shown in FIG. 1
Figure 5B:
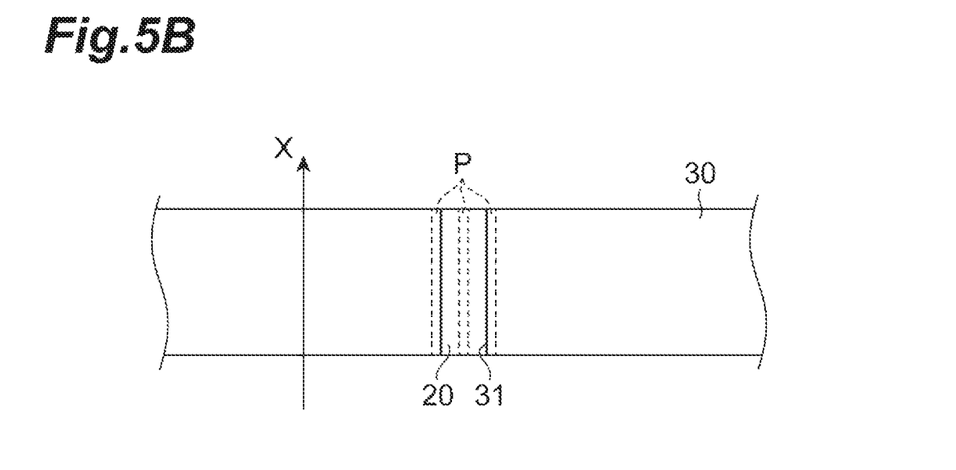

As shown in FIGS. 5A and 5B, the mask 30 has an opening portion 31. More specifically, the mask 30 has a band-shaped opening portion 31 which extends in the cutting direction X, and a width t of the opening portion 31 is designed to be smaller than an entire width L of the altered portions P1 to P15 (t<L). Therefore, when seen in a laser irradiation direction, some of the plurality of altered portions P are exposed through the opening portion 31, and the remaining portions of the plurality of altered portions P overlap the mask 30. In other words, only some of the altered portions P are exposed from the opening portion 31 of the mask 30, and the remaining portions are not exposed. In the embodiment, only the altered portions P1 to P5 are exposed from the opening portion 31 of the mask 30, and the altered portions P6 to P15 are not exposed.

The mask 30 is made of a material having resistance to an etchant used for wet etching which will be described later. The mask 30 may be made of, for example, Cr and may be formed on the substrate 20 with a predetermined thickness (for example, 200 nm) by a sputtering method. The mask 30 may have a single-layer structure or a multi-layer structure (for example, a composite layer of a metal layer and a resin layer). The opening portion 31 of the mask 30 may be formed using a known patterning technique. Patterning of the mask 30 can be performed using a known photolithography technique and wet etching. An alignment mark provided on the upper surface 20a of the substrate 20 can be used for the position alignment of the patterning of the mask 30. Alternatively, some or all of the altered portions P can be used as the alignment mark for the position alignment of the patterning of the mask 30.

Subsequently, wet etching of the substrate 20 is performed (Step S3 in FIG. 1, a third step). Buffered hydrofluoric acid (containing 5 wt % HF and 35 wt % $NH_4F$) may be used as the etchant. A surfactant may be added to the etchant.

The mask 30 having resistance to the etchant is provided on the upper surface 20a of the substrate 20, and a lower surface 20b of the substrate 20 is also covered with the release layer 12 having resistance to the etchant. Therefore, dissolution of the substrate 20 proceeds from the opening portion 31 of the mask 30, the substrate 20 permeates into the altered portion P located below the opening portion 31, and the altered portion P is dissolved and removed. The altered portion P has a higher dissolution rate with respect to the above-described etchant than other portions. As a result, a linear groove is formed in the substrate 20, and the substrate 20 is divided into two portions. Thereafter, the mask 30 is removed (Step S4 in FIG. 1), and the processing of the substrate 20 ends. The support sheet 10 and the release layer 12 can be separated from the substrate 20 at a desired timing using a release liquid such as an organic solvent.

Figure 6:
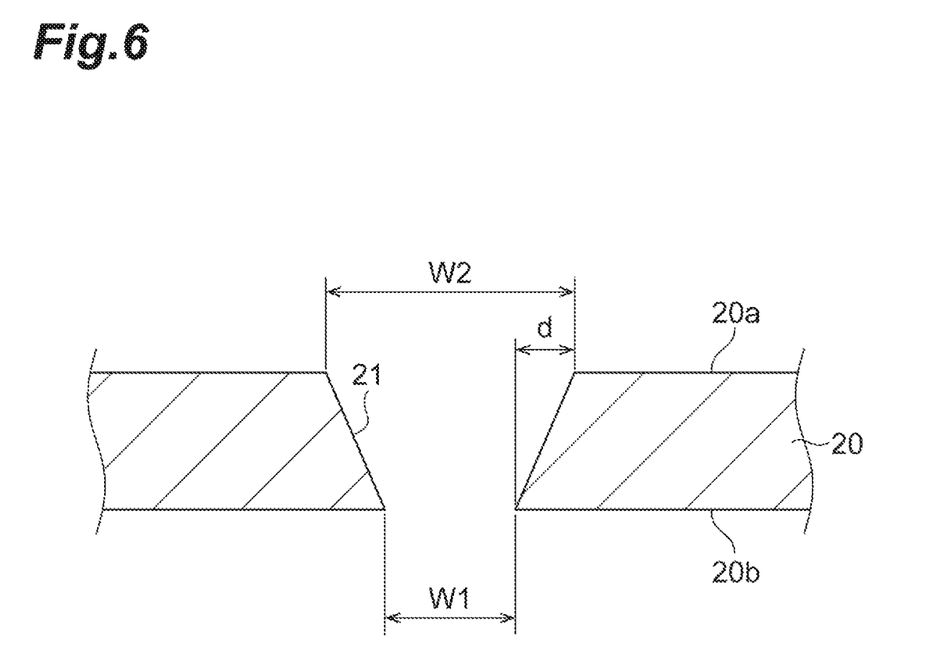
FIG. 6 is a cross-sectional view showing an inorganic material substrate after processing.

FIG. 6 shows a cross section of the substrate 20 after the above-described Steps S1 to S4. A side surface 21 of a cut portion of the substrate 20 is inclined with respect to the thickness direction of the substrate 20, and a width W1 of the cut portion on the lower surface 20b side is smaller than a width W2 thereof on the upper surface 20a side (W1<W2).

According to the above-described processing method, the side surface 21 of the cut portion of the substrate 20 becomes smooth, and also a difference d ((W2−W1)/2 in the embodiment) between the narrowest portion and the widest portion in the cut portion becomes small, that is, a rising angle of the side surface 21 becomes sharp.

Figure 7:
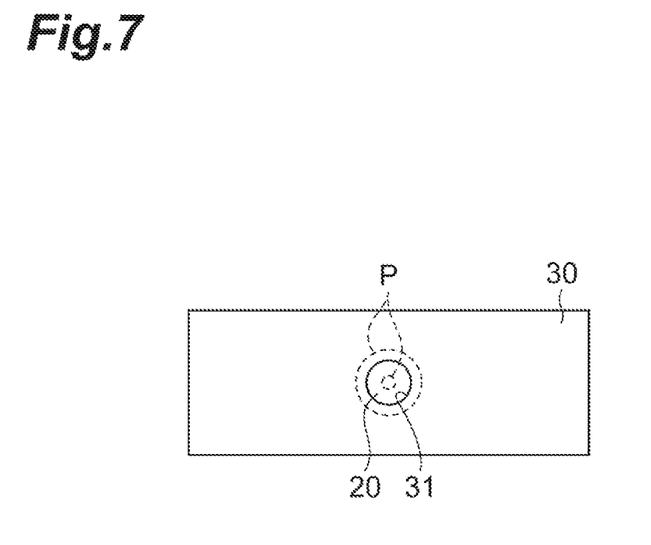
FIG. 7 is a plan view of an inorganic material substrate according to another aspect.

In addition, as shown in FIG. 7, the substrate 20 may be processed into a hole shape by disposing the plurality of altered portions P concentrically. In this case, the plurality of altered portions P are disposed as shown in FIG. 4, and the circular opening portion 31 having a diameter smaller than that of the altered portions P as a whole is provided in the mask 30. Therefore, when seen in the laser irradiation direction, only the altered portions P located at the center of a circle are exposed from the opening portion 31 of the mask 30, and the remaining portions (that is, the altered portions P located on an outer periphery) are not exposed. Even in such a mode, an inner wall of a hole of the substrate 20 becomes smooth, and the difference between a maximum diameter and a minimum diameter of the hole becomes small.

In the above-described processing method of the substrate 20, in Step S2, only some P1 to P5 of the plurality of altered portions P are exposed from the opening portion 31 of the mask 30, and the remaining portions P6 to P15 are not exposed. In this case, at the time of etching in Step 3, etching rates in the altered portions P1 to P5 exposed from the opening portion 31 of the mask 30 and the altered portions P6 to P15 which are not exposed can be made different. Therefore, it becomes easier to obtain a desired processed shape by adjusting the altered portions P1 to P5 exposed from the opening portion 31 of the mask 30 and the altered portions P6 to P15 which are not exposed.

For example, the side surface 21 of the cut portion of the substrate 20 can be smoothed, and the difference d can be reduced by forming the altered portions P1 to P15 inside the substrate 20 and performing the wet etching using the mask 30 in which only the altered portions P1 to P5 are exposed from the opening portion 31, as in the above-described embodiment.

Further, the side surface 21 of the cut portion of the substrate 20 can be curved by forming only some of the altered portions P1 to P15 inside the substrate 20. For example, the side surface 21 which is curved so that the width W1 on the lower surface 20b side and the width W2 on the upper surface 20a are both wide and a central portion in the thickness direction is narrowed can also be formed by forming the altered portions P1 to P5, P6, P9, P10, P11, P14, and P15 by the laser irradiation and then performing the wet etching using the mask 30 formed on the upper surface 20a of the substrate 20. Further, the side surface 21 which is curved so that the width W1 on the lower surface 20b side and the width W2 on the upper surface 20a are both narrow and the central portion in the thickness direction is widened can also be formed by forming the altered portions P2 to P5, P8, and P13 by the laser irradiation and then performing the wet etching using the mask 30 formed on the upper surface 20a of the substrate 20. Furthermore, the side surface 21 can be intentionally made wavy by forming only some of the altered portions P1 to P15 inside the substrate 20.

As described above, according to the above-described method of processing the substrate 20, controllability for controlling the processed shape of the substrate 20 to a desired shape can be improved.

The substrate 20 can be cut into individual pieces, or holes (through holes or holes with a bottom) can be formed by processing the substrate 20 by the above-described processing method. Further, a device can be manufactured using the processed substrate 20. Examples of a device including the substrate 20 include a MEMS element (a microphone, a digital speaker, a yaw rate sensor, an acceleration sensor, a pressure sensor, a high-frequency switch, a variable capacitance element, and the like).

The substrate 20 may be made of a glass other than non-alkali glass. Further, the substrate 20 is not limited to glass as long as it is an inorganic material which is transparent to the above-described laser and may be made of, for example, $SiO_2$ or sapphire. The substrate 20 may be made of an amorphous solid or may be made of a hybrid of an amorphous material and a crystalline material. In this case, in Step 3, since the substrate 20 is isotropically etched, a processed shape can be controlled with higher precision than in a substrate made of a crystalline solid having anisotropy.

EXAMPLES

Figure 8:
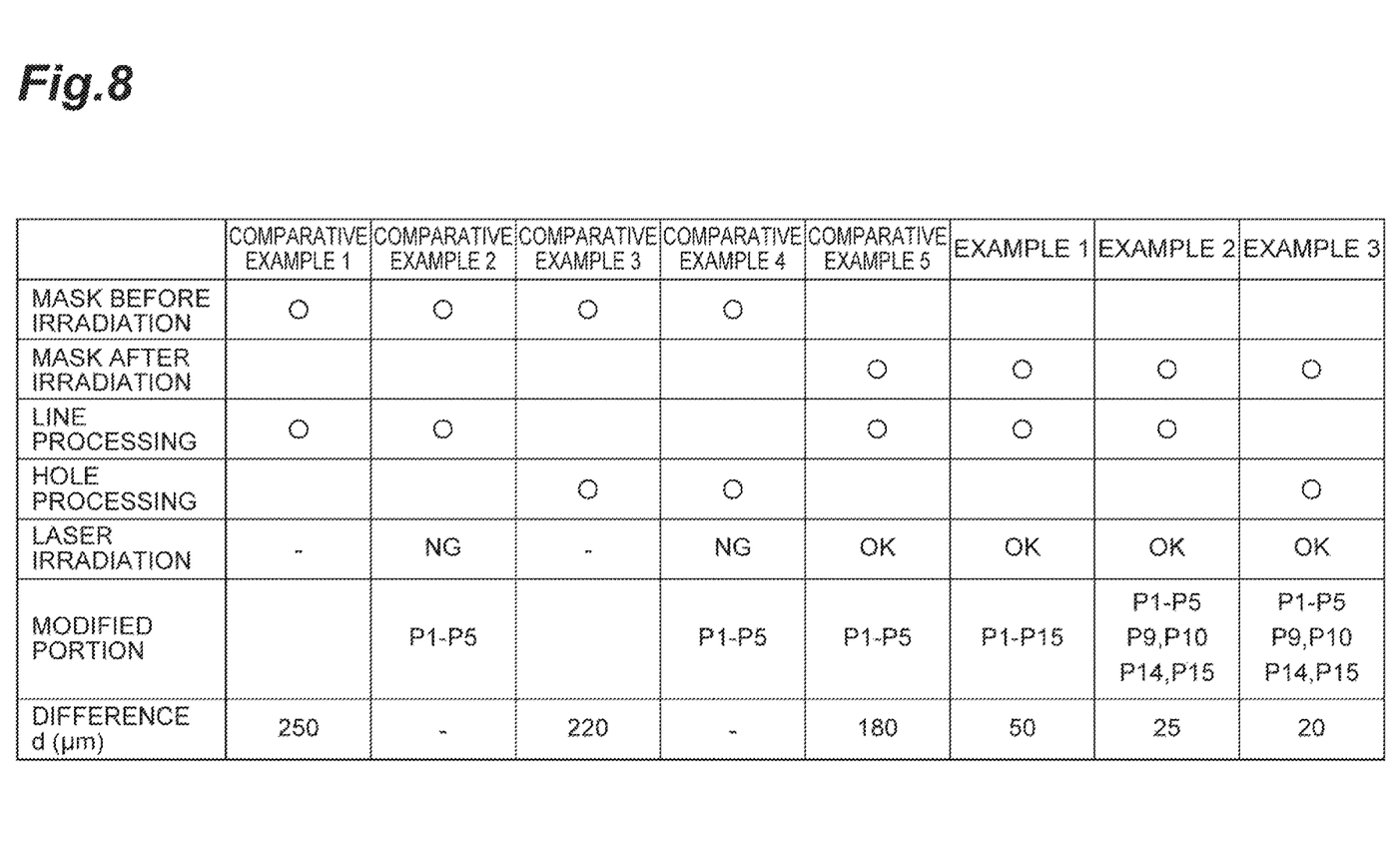
FIG. 8 is a table showing results of an experiment according to an example.

The inventor has performed the following experiment to confirm an effect of the processing method on the difference d. FIG. 8 is a table showing experimental results.

A wafer-shaped non-alkali glass substrate having a diameter of 8 inches and a thickness of 500 μm was prepared as an experimental sample (Comparative Examples 1 to 5 and Examples 1 to 3). In Comparative Examples 1 to 4, a mask was previously formed on the upper surface of the substrate, and thereafter, in Comparative Examples 1 and 3, the wet etching was performed, and in Comparative Examples 2 and 4, the laser irradiation was performed. In Comparative Example 5 and Examples 1 to 3, the mask was formed on the upper surface of the substrate after the laser irradiation.

The above-described Yb:YAG picosecond laser (having a wavelength of 1030 nm) was used as a laser light source and was converted into a half wavelength (a wavelength of 515 nm) using the above-described optical element. The above-described Cr mask (having a thickness of 200 nm) was used as the mask. Buffered hydrofluoric acid (containing 5 wt % HF and 35 wt % NH$_4$F) to which the above-described surfactant was added was used as an etchant for wet etching. The wet etching was terminated when an etching width (the width W1 shown in FIG. 6) of the lower surface of the substrate reached 200 μm. The positions of the altered portions formed inside the substrate by the laser irradiation are as shown in the table of FIG. 8.

As shown in the table of FIG. 8, in Comparative Example 1, when the wet etching using the mask was performed to process and cut the substrate into a line shape, the difference d was 250 μm. Similarly, in Comparative Example 3, when the wet etching using the mask was performed to form a hole in the substrate, the difference d (½ the length of the difference between the maximum diameter and the minimum diameter) was 220 μm. Also, in Comparative Examples 2 and 4, the laser irradiation using the mask was attempted to perform line processing or hole processing on the substrate. However, since the mask was on the upper surface of the substrate, the laser could not be condensed well, and the altered portions could not be formed. In Comparative Example 5, when the altered portions P1 to P5 were formed by the laser irradiation and then wet etching was performed using the mask formed on the upper surface of the substrate to process and cut the substrate into a line shape, the difference d was 180 μm.

On the other hand, in Examples 1 to 3, processing with a small difference d could be performed. In Example 1 in which the altered portions P1 to P15 were formed by the laser irradiation, the difference d was 50 μm. In Example 2 in which the altered portions P1 to P5, P9, P10, P14, and P15 were formed by the laser irradiation, the difference d was 25 μm. In Example 3, when the altered portions P1 to P5, P9, P10, P14, and P15 were formed by the laser irradiation and then the wet etching was performed using the mask formed on the upper surface of the substrate to form holes in the substrate, the difference d was 20 μm.

The disclosure is not limited to the above-described embodiments and can be variously modified. For example, the number of altered portions is not limited to 15 and may be increased or decreased as appropriate. The number of stages of the altered portions is not limited to five and may be increased or decreased as appropriate. A processing speed of the subsequent etching process may be increased by increasing the number of the altered portions or the number of stages. An arrangement shape of the altered portions when seen in the laser irradiation direction is not limited to the line shape or the concentric shape and may be changed as appropriate.

In the third step, dry etching may be performed instead of the wet etching. In dry etching, argon gas plasma may be used. In the second step, both the upper surface and the lower surface of the substrate may be covered with the above-described mask, and the etching process in the third step may be performed from both surfaces of the substrate.

What is claimed is:

1. A method of processing an inorganic material substrate, the method including:
    a first step of forming a plurality of altered portions inside the inorganic material substrate transparent to a laser by means of radiation of the laser to the inorganic material substrate;
    a second step of covering at least one surface of the inorganic material substrate having the altered portions formed therein with a mask, the mask exposes some of the plurality of altered portions through an opening portion of the mask and overlaps remaining portions of the plurality of altered portions; and
    a third step of performing an etching process on the inorganic material substrate using the mask and removing the altered portion,
    wherein the plurality of altered portions includes spaced columns of altered portions, the spaced columns of the altered portions extending in a direction of the radiation of the laser.

2. The method according to claim 1, wherein the inorganic material substrate is made of an amorphous solid or a hybrid of an amorphous material and a crystalline material.

3. The method according to claim 1, wherein the inorganic material substrate is made of glass.

4. The method according to claim 1, wherein the laser used in the first step is a Yb:YAG picosecond laser.

5. The method according to claim 4, wherein a wavelength conversion element is on an optical path of the laser in the first step, and a wavelength of the laser is converted to a visible light region by the wavelength conversion element.

6. The method according to claim 1, wherein, in the second step, position alignment of the mask is performed with reference to positions of the plurality of altered portions.

7. The method according to claim 1,
    wherein an alignment mark is formed on the inorganic material substrate using the laser in the first step, and
    the position alignment of the mask is performed with reference to the alignment mark in the second step.

8. The method according to claim 1, wherein a hole is formed in the inorganic material substrate by removing the altered portion in the third step.

9. The method according to claim 1, wherein the inorganic material substrate is segmented into individual pieces by removing the altered portion in the third step.

10. The method according to claim 1, wherein each of the spaced columns of altered portions is spaced from other of the spaced columns of altered portions in a direction orthogonal to the direction of radiation of the laser.

11. The method according to claim 10, wherein the each of the spaced columns of altered portions includes at least two altered portions spaced in the direction of radiation of the laser.

12. The method according to claim 11, wherein at least one of the spaced columns of altered portions is exposed by the mask and at least a second of the spaced columns of altered portions is overlapped by the mask.

* * * * *